(12) United States Patent
Winker et al.

(10) Patent No.: US 6,239,853 B1
(45) Date of Patent: May 29, 2001

(54) STAGGERED WAVEPLATE LCD PRIVACY SCREEN

(75) Inventors: Bruce K. Winker, Thousand Oaks; Donald B. Taber, Newbury Park, both of CA (US)

(73) Assignee: Rockwell Science Center, LLC, Thousand Oaks, CA (US)

( * ) Notice: Subject to any disclaimer, the term of this patent is extended or adjusted under 35 U.S.C. 154(b) by 0 days.

(21) Appl. No.: 09/410,824

(22) Filed: Oct. 1, 1999

(51) Int. Cl.[7] .................................................. G02F 1/1337
(52) U.S. Cl. ............................................. 349/117; 349/119
(58) Field of Search ...................................... 349/117, 118, 349/119

(56) References Cited

U.S. PATENT DOCUMENTS

| | | | |
|---|---|---|---|
| 5,196,953 | 3/1993 | Yeh et al. | 359/73 |
| 5,504,603 | 4/1996 | Winker et al. | 359/73 |
| 5,557,434 | 9/1996 | Winker et al. | 359/73 |
| 5,589,963 | 12/1996 | Guning, III et al. | 349/119 |
| 5,612,801 | 3/1997 | Winker | 349/119 |
| 5,619,352 | 4/1997 | Koch et al. | 349/89 |
| 5,638,197 | 6/1997 | Gunning, III et al. | 349/96 |
| 5,838,407 | * 11/1998 | Chigrinov et al. | 349/117 |
| 6,046,787 | * 4/2000 | Nishiguchi | 349/117 |

FOREIGN PATENT DOCUMENTS 10-54883 * 2/1998 (JP) .

OTHER PUBLICATIONS

Hiroshi Hasebe; Kiyofumi Takeuchi; Haruyoshi Takatsu. *Properties of Novel UV–Curable Liquid Crystals and Their Retardation Films*, Mar. 3, 1995, pp.4.

* cited by examiner

*Primary Examiner*—James A. Dudek
(74) *Attorney, Agent, or Firm*—Koppel & Jacobs; Michael J. Ram

(57) ABSTRACT

An assembly for restricting the angle of vision of an image emitted from an LCD screen comprising a linearly parallel arrangement of two polarizing films with at least two waveplates there between. The transmission planes of the polarizing films are at an angle, preferably 90° to each other. At least two parallel waveplates are positioned between, the polarizing films. Each waveplate has parallel transmitting regions alternating between birefringent and isotropic regions. The waveplates are positioned in a spaced apart relationship to each other such that substantially orthogonal light passing through the first polarizing screen and one of the birefringent or isotropic alternating transmitting regions of the first waveplate will pass through the other of the alternating striped transmitting regions of the second waveplate. Light so transmitted will then pass through the second polarizing film and be viewable. At least a portion of the horizontal components of non-orthogonal light incident on the waveplate assembly will not pass through the second polarizing film This assembly results in a angle of vision narrower than from the LCD screen.

7 Claims, 3 Drawing Sheets

STAGGERED WAVEPLATE LCD PRIVACY SCREEN

BACKGROUND OF THE INVENTION

This invention addresses liquid crystal displays (LCDs) and, more particularly, an assembly for restricting the field of view of such displays so that the image appearing on the LCD is visible primarily to a user sitting directly in front of the screen and is not observable to other individuals viewing the screen at an oblique angle. This objective is achieved by substantially eliminating light emanating from the screen other than in a substantially perpendicular manner.

DESCRIPTION OF THE PRIOR ART

Liquid crystals are useful for electronics displays because polarized light traveling through the liquid crystal layer is affected by the layer's birefringence, which can be changed by the application of a voltage across the layer. As a result, the transmission or reflection of light can be controlled with much less power than is required for the luminescent materials used in other types of displays. This contributes to the longer life, lower weight and low power consumption of the LCD displays.

In LCD computer monitor and television displays a matrix of pixels is arranged across the display. These pixels are activated by an X-Y sequential addressing scheme between two sets of perpendicular conductors. Where the displays incorporate nematic liquid crystals, arrays of thin film transistors can be used to control the driving voltages at the individual pixels.

In many applications, it is desirable to broaden the angle under which the display is viewable without distortion of loss of contrast. For example, in avionics it is important that the display be clear and undistorted to several individuals viewing the screen from various angles. In many instances, it is also desirable for a computer display to be visible to observers other than the user and for video screens to present an undistorted image to an audience sitting other than directly in front of the screen. Assemblies which will allow a greater undistorted, high intensity viewing angle are shown in numerous prior art references, such as U.S. Pat. No. 5,612,801 to Winker.

However, numerous applications are arising where it is desirable to significantly narrow the usable viewing angle to provide viewing privacy. The intention is to allow access to the image on the screen only to the party sitting directly in front of the screen and to prevent a person sitting next to the user or standing over the user from seeing the image on the screen. For example, it is now becoming commonplace for computer users to use portable computers on airplane flights to work on proprietary documents. For security reasons, it is most desirable to prevent a passenger sitting in the next seat or passing down the aircraft isle from observing the information on the screen. Secondly, newer cabin designs in aircraft are replacing larger, centrally located viewing screens, usually hanging over the aisle, with smaller individual screens which drop from the overhead compartment, or individual screens mounted in each passenger's seat back or tray table so that each passenger can select his own entertainment. Often, because each passenger may be receiving and/or paying individually for his or her chosen entertainment display, such as a movie or access to various web sites or, for security reasons, the receipt of proprietary e-mail messages, it is desirable to prevent surrounding parties from observing the contents of the display.

SUMMARY OF THE INVENTION

Most devices developed to enhance usage of LCD displays are directed to making the image thereon available to a broader audience. Devices which can be added to the LCD device to narrow the field of view and limit the scope of the viewing audience in a simple, light weight and unobtrusive manner without loss of brightness of the image are not commonly available. Currently, to reduce the angle of vision micro-louvers, provided by 3M, are used. However they result in a reduction of image brightness which must be compensated for by increasing the power applied to the back light and/or use of various brightness enhancing films. That deficiency is addressed by the present invention which comprises an LCD screen in combination with at least two spaced apart patterned half-waveplates and a linear polarizer assembled in a manner such that the horizontal components of light rays emitted from the LCD screen in other than a substantially orthogonal manner are blocked by the waveplate assembly and not transmitted to the observer. As a result, the opportunity to view the image on the screen from other than approximately 90° is significantly reduced or eliminated. The intensity of the transmitted light may be enhanced by the addition a brightness enhancement film.

DETAILED DESCRIPTION OF THE INVENTION

Figure 1:
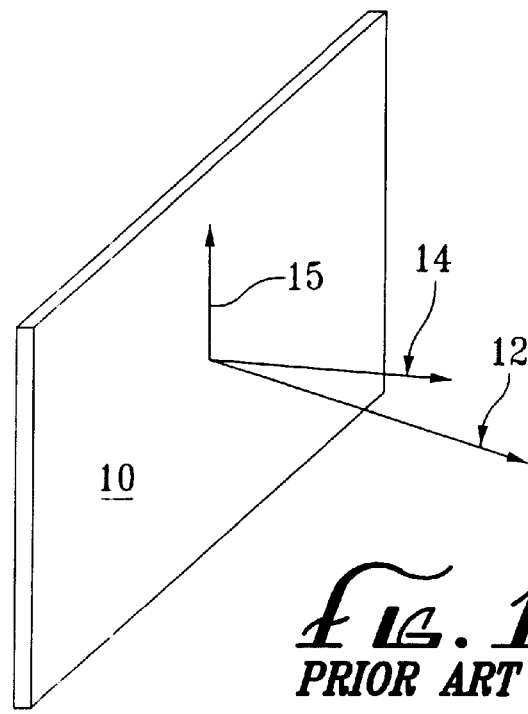
FIG. 1 is a schematic perspective representation of light emitted from state of the art LCD screens.

FIG. 1 is a schematic representation of an LCD display 10 showing a ray of light 12 emanating perpendicular (orthogonal or normally incident) to the face of LCD screen (90°) and two non-orthogonal rays of light 14 and 15, which are representative of non-orthogonal light. The first ray 14 is other than 90° in the horizontal direction only and the second ray is other than 90° in the vertical direction only. The non-orthogonal ray with horizontal components 14 provides visibility of the image on the LCD screen to other than the individual sitting directly in front of the screen. It is the purpose of this invention to prevent as much as is practical of this horizontal, non-orthogonal ray from being visualized.

Figure 2:
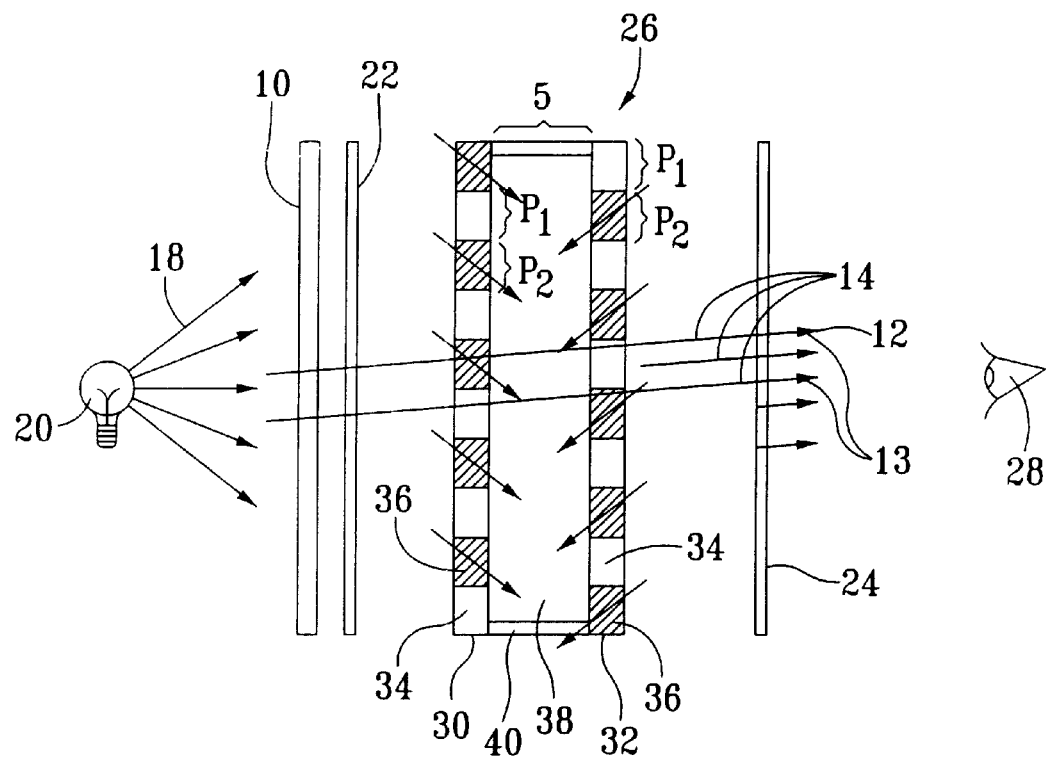
FIG. 2 is schematic expanded top view of an assembly incorporating features of the invention added to a state of the art LCD screen as shown in FIG. 1.

FIG. 2 shows a typical back lit LCD arrangement incorporating features of the invention. Light 18 generated by a source 20 behind the LCD screen 10, in combination with electronic activation of the LCD screen pixels, generates an image on the screen. That light permeates through the transparent portions of the screen. This light can radiate orthogonally, as well as at various different angles to the face of the LCD screen. A conventional display output polarizer 22 is used on the exit side of the LCD display 10 to create the display image. The display output polarizer 22 may, in fact be provided as part of the LCD display. It serves as the input polarizer for the waveplate assembly and will be referred to as the "input polarizer." If an LCD is not used, an input polarizer must be added in front of the waveplate assembly. The polarizer transmits only those wavetrain components of light which vibrate parallel to the polarizing direction of the film and absorbs those that vibrate at a right angle to said direction. While some wavetrain components not parallel to the polarizing direction of the polarizing film may be transmitted, the light emerging (passing through) the polarizing film is substantially linearly polarized.

A material is birefringent if it has different refractive indices in different directions. Any material may be fully characterized by 3 principle indices along orthogonal axes. If two of these indices are the same (called "ordinary", $n_o$) and the third is different (called "extraordinary", $n_e$) it is uniaxially birefringent. If $n_e > n_o$ it is positively birefringent. If the refractive index is the same in all three directions the material is referred to as "isotropic".

In a uniaxially birefringent film structure, if the extraordinary index (or c-axis) lies in the plane of the film, it is referred to as an a-plate. This is because it has the same optical symmetry as what crystallographers refer to an as a-cut crystal. Such an a-plate is said to be half-wave if its thickness, d, and birefringence $n_e - n_o$ are chosen such that:

$$(n_e - n_o)d = \lambda/2$$

Half-waveplates have the property that when plane polarized light is incident on them such that the polarization vector makes an angle theta ($\theta$) with the extraordinary axis of the film, the plane of polarization is rotated by twice theta as the light passes through.

Spaced there from and further removed from the LCD 10, with its transmission axis orthogonal to that of the input polarizer 22, is an additional polarizer 24, often referred to as an analyzer. Selected components of light exiting the input polarizer 22 have ther polarization vector rotated 90° by the half-waveplate assembly 26 positioned between the two polarizers. The analyzer 24 is positioned so that the rotated components of light which subsequently exit the waveplates are transmitted there through. As is further explained below, unrotated light will not pass through the additional polarizer 24 and therefore can not be seen by an observer 28 positioned beyond the additional polarizer 24.

Located between the input polarizer 22 and the additional polarizer 24 is an assembly 26 which includes half-waveplates 30, 32 having a staggered, striped pattern which serves, in combination with the additional polarizer 24, to prevent light traversing the waveplate in a oblique horizontal manner and transmitted through the input polarizer 22 from reaching the observer 28. The half-wave ($\lambda/2$) plate assembly 26 comprises, in a preferred embodiment, two patterned half-waveplates 30, 32 spaced a fixed preselected distance S apart. One of the waveplates 30 has its c-axis at +45° to the analyzer transmission angle so that a birefringent striped portion of the waveplate rotates light a fixed angle (90°) in one direction while the second waveplate 32 has its c-axis at +45° or −45° to the analyzer transmission axis so that that a birefringent striped portion rotates the light an additional ±90°(to 0 or 180°). Each half-waveplate 30, 32 has alternating isotropic and birefringent portions 34, 36, the isotropic portion 34 transmitting light without rotation and the birefringent portion 36 rotating the polarized light the desired angle and in the intended direction.

Each portion 34, 36 preferably has the same longitudinal dimension $P_1 = P_2$. If $P_1$ is not equal to $P_2$ then a null (zero transmission) can not be reached. The two half-waveplates are positioned in relationship to each other so that light 12 passing perpendicular, or substantially perpendicular 13, through the isotropic portion 34 of the first half-waveplate 30 will then pass through the birefringent portion 36 of the second waveplate 32. In the alternative, light 12 passing perpendicular, or substantially perpendicular 13, through the birefringent portion 36 of the first half-waveplate 30 will then pass through the isotropic portion 36 of the second waveplate 32. In both instances, the light passing through the input polarizer 22 will be rotated by the half-waveplate assembly 26 through a 90° angle and then pass through the additional polarizer 24 oriented with the horizontal component perpendicular to the stripe direction of the waveplate 22 with its transmission plane at 90° to the transmission plane of the input polarizer 22, allowing the LCD image to be visualized by the observer 28. Substantial fractions of all other light 14 emanating from the input polarizer 22 will encounter birefringent portions 36 on both half-waveplates 30, 32, or two isotropic portions 34, the light 14 being absorbed by the analyzer 24 rather than transmitted through the analyzer 24.

Figure 3:
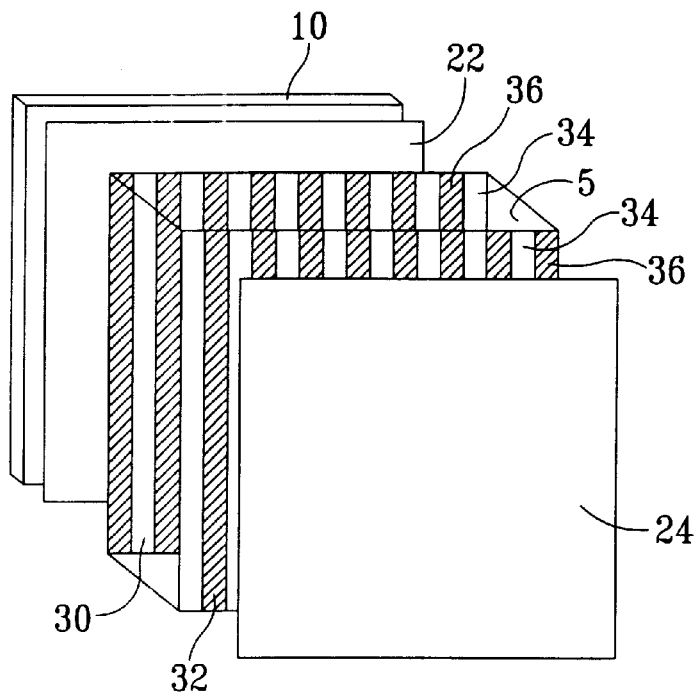
FIG. 3 is a perspective front view of the assembly of FIG. 2.

The desired null angle depends on the environment in which the screen will operate. FIG. 3 is a graph showing the percent transmission of light with two half-waveplates 30, 32 imbedded in a material having a refractive index of 1.5 and S=1.4($P_1 + P_2$) with $P_1 = P_2$. The result is a null (zero light transmission) at ±30° which is the preferred null angle for most environments.

At angles greater than the null point a percentage of the light may again be transmitted but it may have an intensity or contrast ratio such that it is not readily visualized. The null point can be varied by changing the distance, S between the two half-waveplates. As the plates are brought closer, ie S is made smaller, the null angle increases until it reaches 180° as the two half-waveplates contact each other. Conversely, as the half-waveplates are moved further apart (S is increased) the null angle decreases. However, the half-waveplate assembly 26, and the combination with the polarizers 22, 24 becomes to thick to be practical. Preferably, the null point is not greater than 40°. The size of $P_2$ is based on the pixel size in the LCD. $P_2$ should optimally be dimensioned smaller than the size of the pixels on the LCD screen. In a preferred embodiment $P_1 = P_2 = 17.5\mu$ and $S = 50\mu$. However, $P_1$ and $P_2$ can vary from about $10\mu$ to about $200\mu$ and S can vary from about $25\mu$ to about $500\mu$.

If $\theta_{ext}$ is the disired viewing angle at which zero transmission occurs, n is the refractive index of the imbedding material and $P_1 = P_2$ then the formula controlling the selection of the space, S between the half-waveplates is $$S/P_2 = \cot[\arcsin(\sin \theta_{ext}/n)]$$

In a typical case for $\theta_{ext} = 30°$, n=1.5 and $S/P_2 = 2.8$

The space S can be provided by a transparent isotropic filler material 38, such as an adhesive of known thickness, completely filing the space. Alternatively, a spacer of known thickness 40 may be used along with the filler material 38 to aid in maintaining the spacing between the half-waveplates 30, 32.

Figure 4:
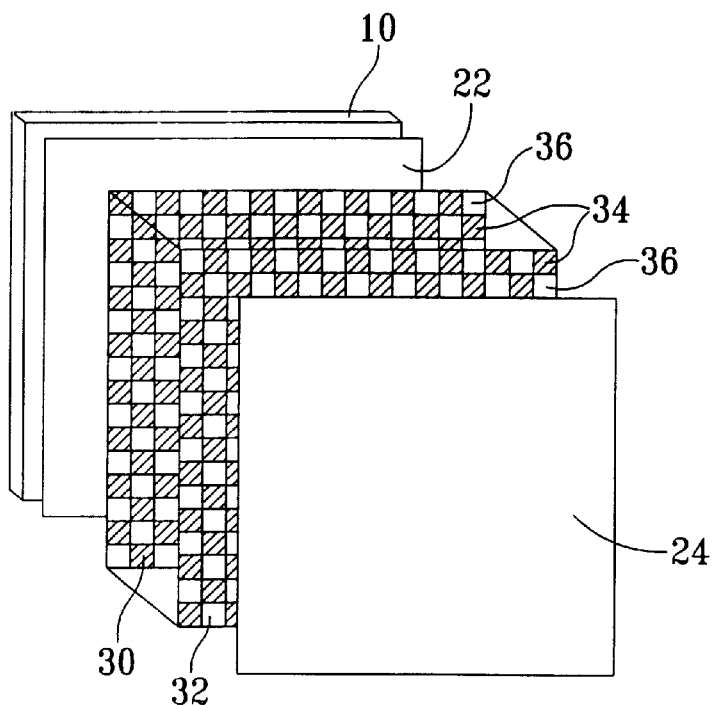
FIG. 4 is a perspective view of a second embodiment of the assembly having a checkerboard pattern on the half-waveplates.

FIG. 4 shows a further embodiment which uses a staggered checker board pattern rather than a striped pattern. Like numbered components will function in the same manner as those described above. Stripes restrict the angle of vision only in a direction perpendicular to the stripes. Therefore, this embodiment has the added feature of being able to also restrict transmission of non-orthogonal light in the horizontal and vertical directions.

Another way to restrict viewing in both the horizontal and vertical direction is to use a second staggered waveplate assembly with its stripes oriented horizontally. A second input polarizer must be added between the two staggered waveplate assemblies, with the second input polarizer crossed to the first input polarizer. In such instance the analyzer polarizer would be crossed to the second input polarizer rather than the first input polarizer.

The invention described herein does not require any particular form of half-waveplate, there being several techniques for forming the waveplates shown in the published literature. However, two techniques are typically used. One technique is to uniaxially stretch certain plastic films, such as a polycarbonate, or polyvinyl alcohol polymer films and, while maintaining the film in the stretched condition, using pressure and/or heat, stamping an alternating striped pattern on the film. This can create parallel alternating regions that are isotropic or birefringent. Another alternative is to solvent cast a solution of a polymerizable liquid crystal monomer onto a rubbed polyimide film. The c-axis of the liquid crystal film which is formed will align with the rub direction of the polyimide film. The film is dried and polymerized leaving a birefringent polymer coating on the polyimide film. A photoresist is then applied to the surface of the polymer film, the photresist is covered with a striped photomask with desired stripe width and parallel portions of the photoresist are etched away leaving birefringent and isotropic stripes. Other methods of forming such birefringent films are known to those skilled in the art.

Figure 5:
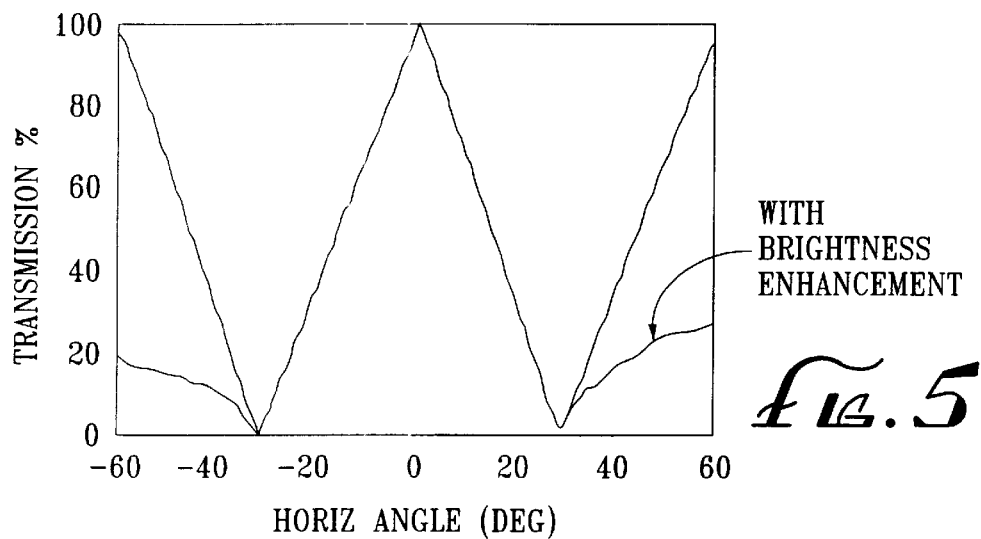
FIG. 5 is a graph showing the transmission through staggered waveplates between crossed polarizers.
Figure 6:
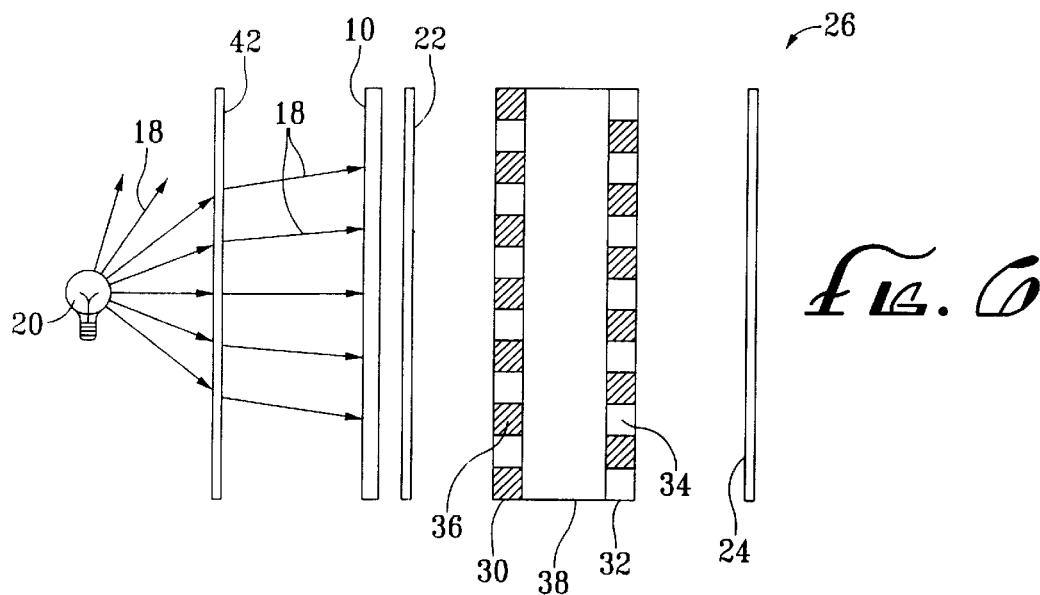
FIG. 6 is a schematic top view of the assembly of FIG. 2 with the addition of a brightness enhancing film.

As a further improvement of the above described device, a brightness enhancing film 42 can be added, as shown in FIG. 6, between the source 20 and the LCD screen 10. A brightness enhancing film utilizes refractive optics to concentrate light in a more forward direction so that less light is transmitted in the oblique direction. These films are commercially available. The brightness enhancing film 42 focuses the light 18 emanating from the source 20 so that more of the light 18 reaches the back surface of the LCD 10 making the LCD image brighter and, as a result, the light reaching the observer 28 is more intense. This is shown in the graph of FIG. 5. When the brightness enhancing film is used less light is available at angles further from orthogonal and as a result the percent of transmitted light at greater than the null angle is reduced.

In a preferred embodiment the half-waveplates 30, 32 are designed for 550 nm light. However, such a waveplate is close enough to half-wave that the assembly will operate in the intended manner for all frequencies of visible light which reach it.

While the invention has been shown and described with reference to different embodiments thereof, it will be appreciated by those having skill in the art that variations in form, detail, compositions and operating conditions may be made without departing from the spirit and scope of the invention as defined by the accompanying claims.

For example, while half-waveplates have been described, it is possible to use two plates which rotate light the same angles but different than 90°. However, such a system will operate in a less efficient manner and may not produce a null point. Also, more then two waveplates can be used and the ratio of $P_1$ to $P_2$ and the relationship of S to $P_1$ and $P_2$ can be varied to further reduce the null angle. One skilled in the art will also recognize that there exists various other techniques, not described herein, to produced polarized light. This invention contemplates using alternative polarizing techniques. Further, while the assembly set forth herein is described in conjunction with and LCD screen, one skilled in the art will recognize that it can be utilized to provide privacy to all manner of screens used to present an image.

What is claimed is:

1. An assembly for reducing the viewing angle of light emanating from display comprising:

an input polarizer film and an analyzer polarizer film, said films being spaced apart and parallel, the analyzer polarizer film having a transmission axis oriented so that it transmits linear polarized light incident thereon which is 90° to the linear polarized light exiting through the input polarizer, a half-waveplate assembly positioned between the input polarizer film and the analyzer polarizer film, said assembly causing linearly polarized light propagating orthogonal to the surface of the display to be transmitted through the waveplate assembly rotated 90°, wherein the half-waveplate assembly comprises a first waveplate and at least one second waveplate, the at least one second waveplate spaced a fixed distance from the first waveplate, each waveplate having multiple alternating birefringent and isotropic stripes, the isotropic stripes transmitting polarized light normally incident thereon without rotation and the birefringent stripes transmitting polarized light normally incident thereon with a defined angle of rotation, the second waveplate being positioned so that the normally incident polarized light passing through the isotropic stripes on the first waveplate will pass through one of the birefringent stripes on the second waveplate and normally incident polarized light passing through the birefringent stripes on the first waveplate will pass through one of the isotropic stripes on the second waveplate causing the polarized light normally incident on the first waveplate to be transmitted from the second waveplate rotated 90°.

2. The assembly of claim 1 wherein the multiple alternating isotropic and birefringent stripes each have the same width.

3. The assembly of claim 2 wherein the width is from about 10µ to about 200µ.

4. The assembly of claim 2 wherein the width is about 20µ.

5. The assembly of claim 1 wherein the fixed distance between the first waveplate and the second waveplate is from about 25µ to about 500µ.

6. The assembly of claim 1 wherein the fixed distance between the first waveplate and the second waveplate is about 50µ.

7. The assembly of claim 1 wherein the fixed distance between the first waveplate and the second waveplate is filled with an adhesive.

\* \* \* \* \*